UNITED STATES PATENT OFFICE.

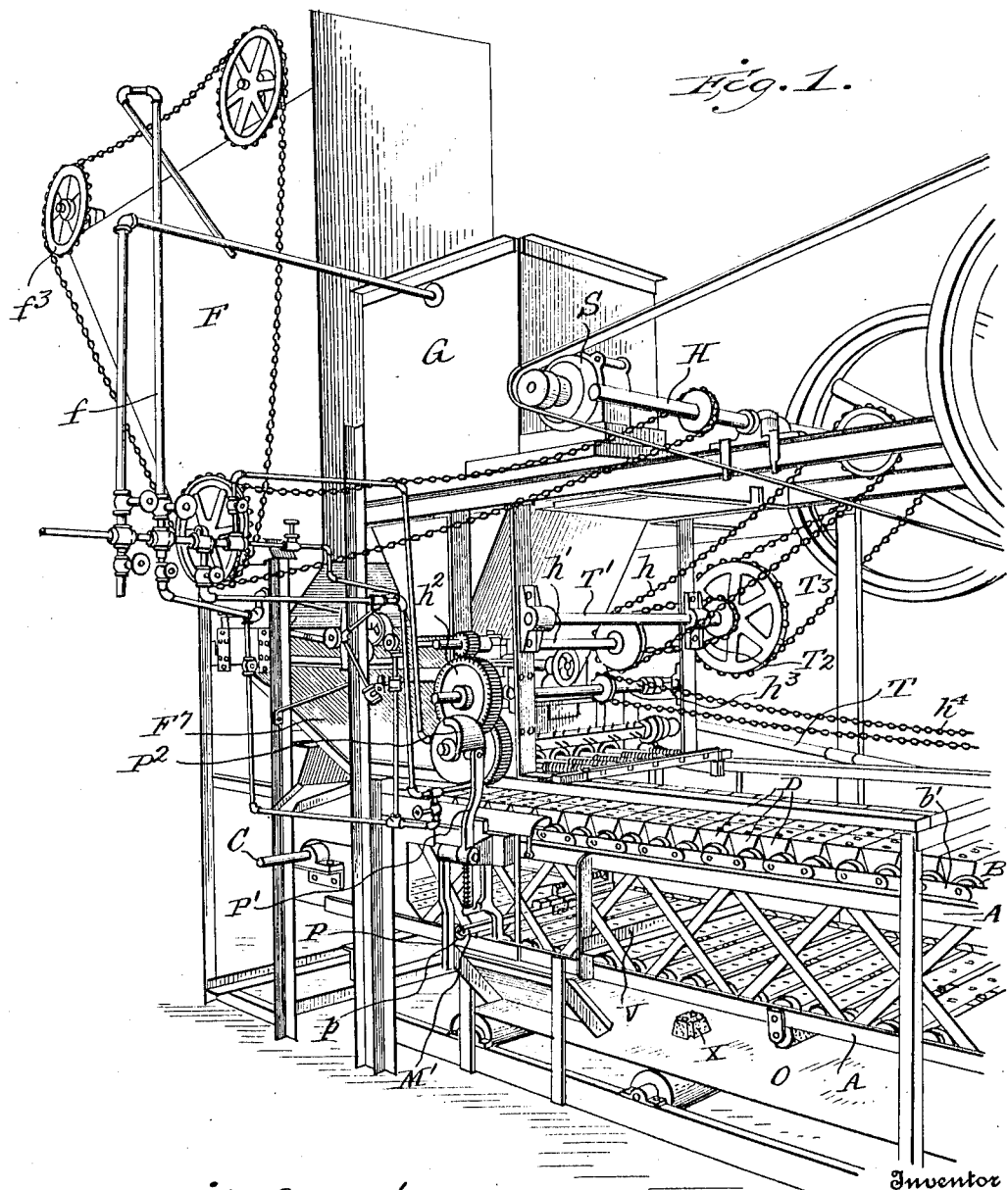

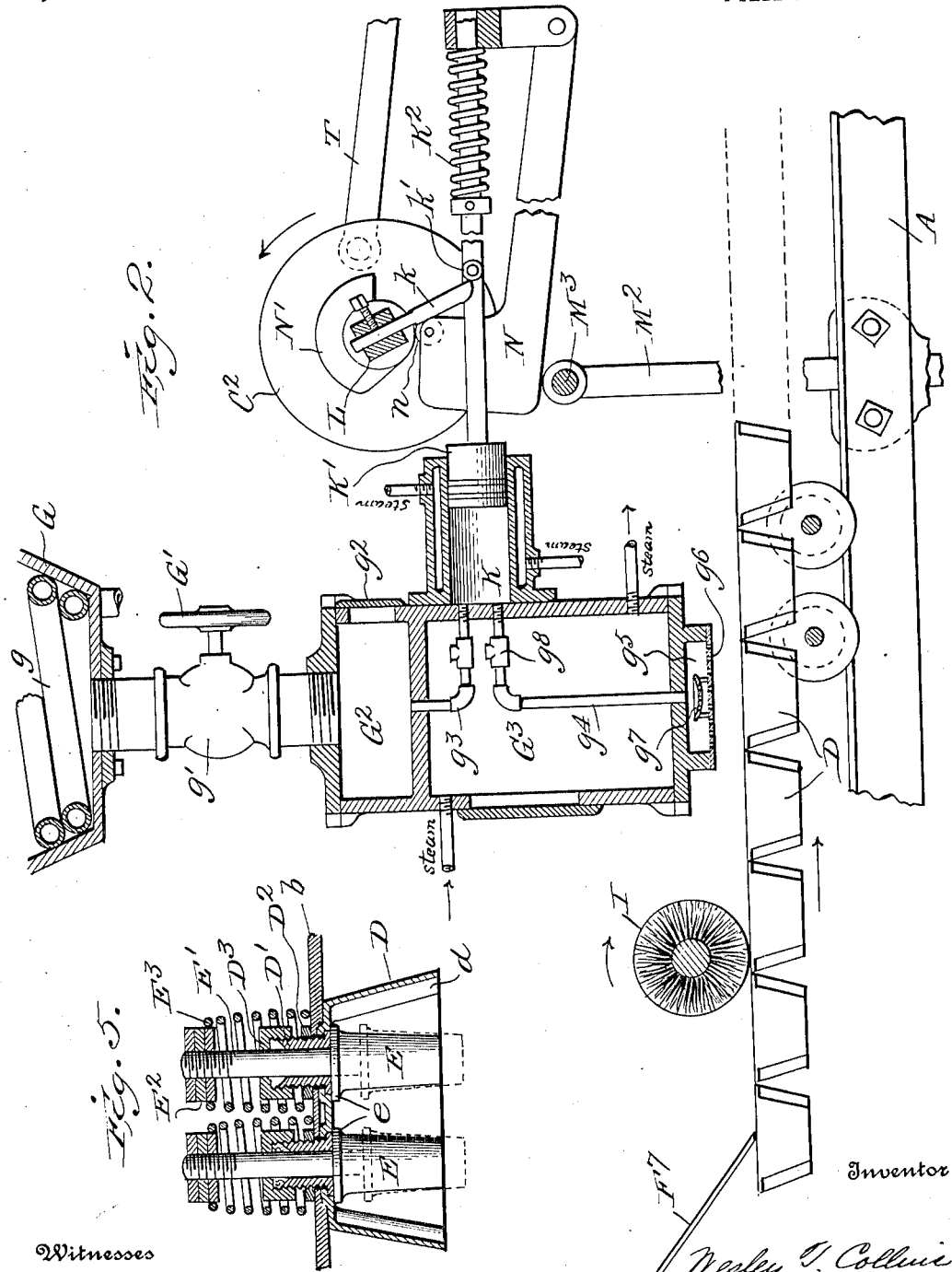

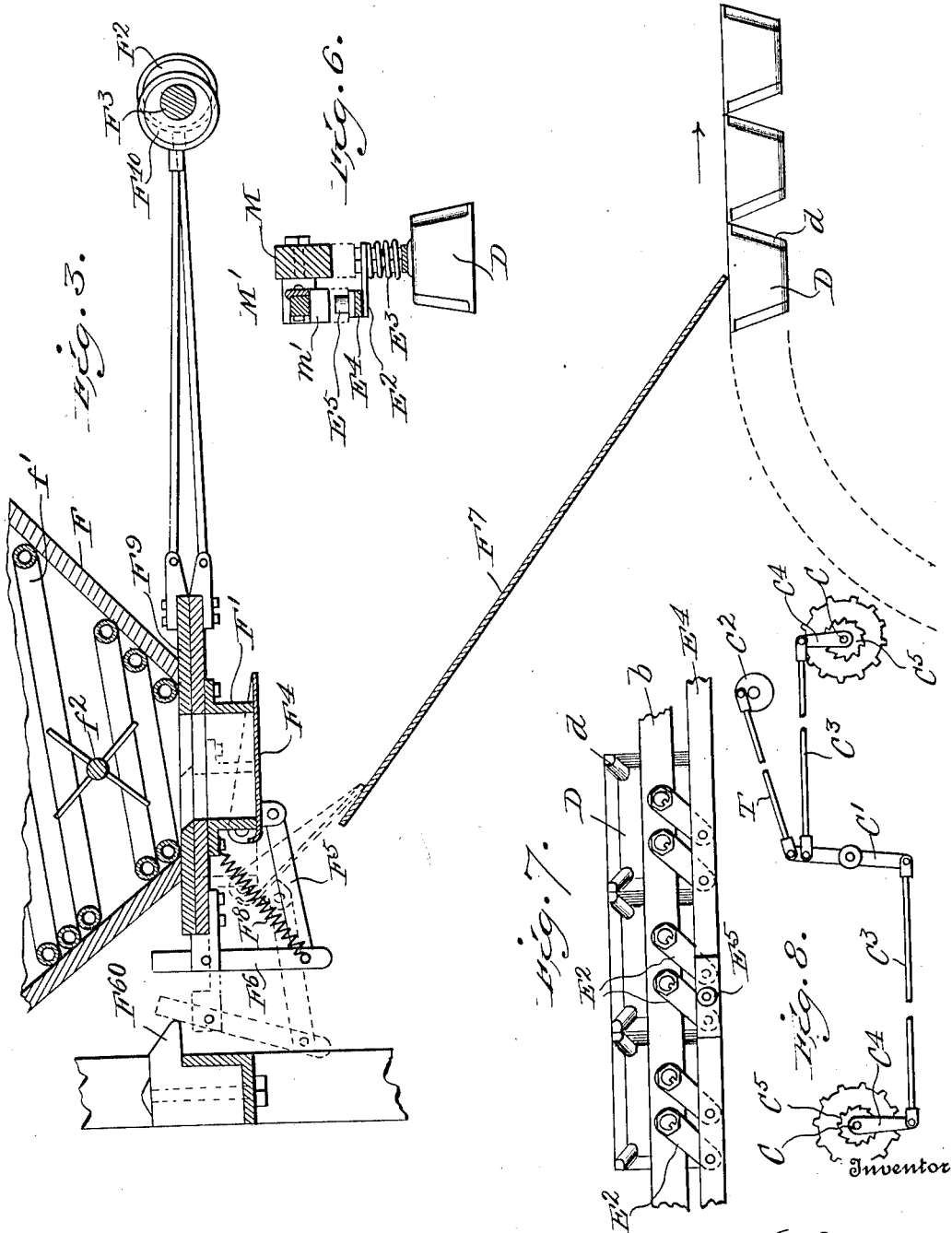

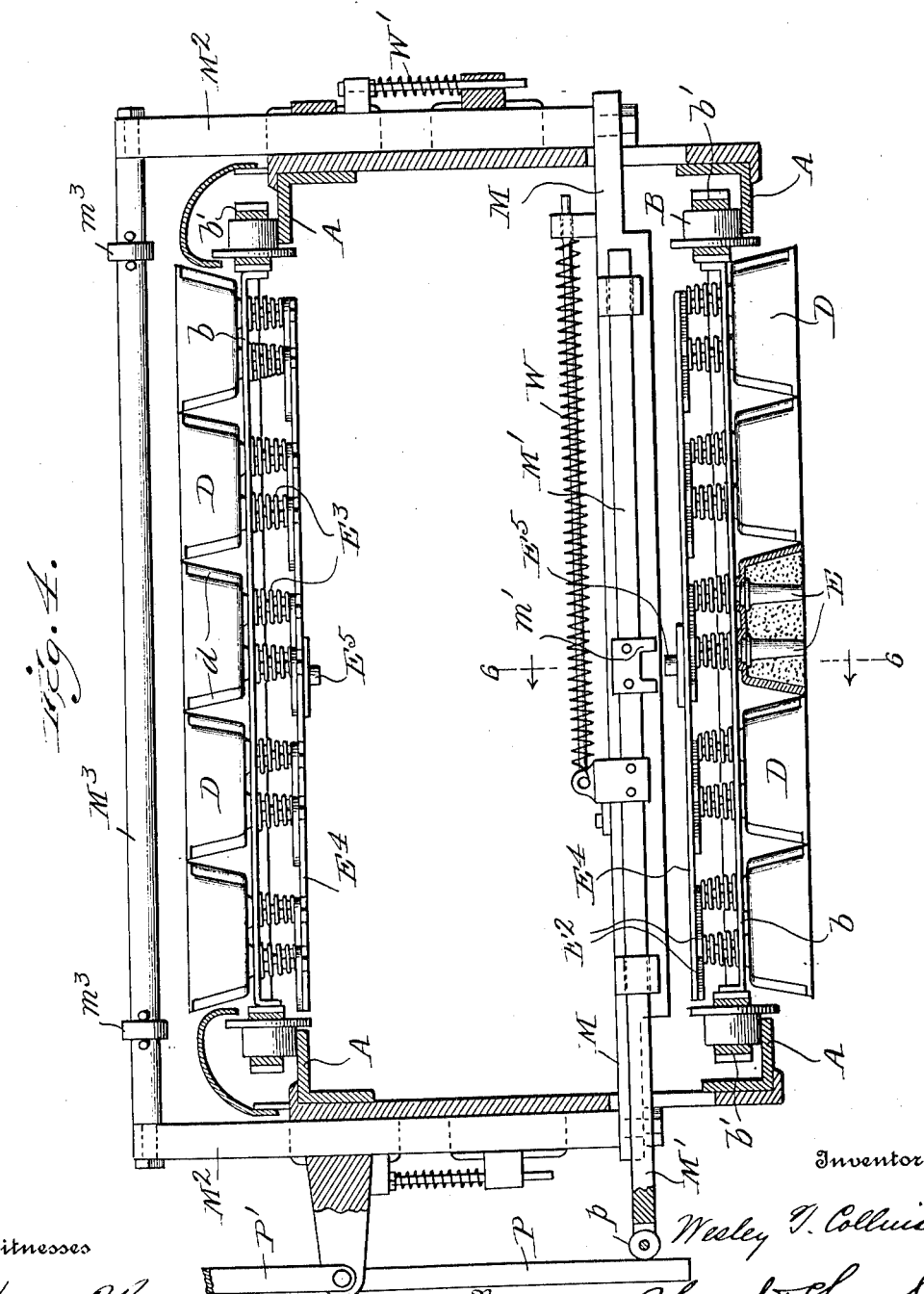

WESLEY T. COLLINS, OF COLORADO SPRINGS, COLORADO.

BRIQUET-MOLDING MACHINE.

1,117,483.   Specification of Letters Patent.   Patented Nov. 17, 1914.

Application filed April 10, 1914.  Serial No. 830,989.

*To all whom it may concern:*

Be it known that I, WESLEY T. COLLINS, a citizen of the United States, residing at Colorado Springs, in the county of El Paso and State of Colorado, have invented certain new and useful Improvements in Briquet-Molding Machines; and I do hereby declare the following to be a full, clear, and exact description of the same, reference being had to the accompanying drawings, forming part of this specification, and to the figures and letters of reference marked thereon.

This invention relates to apparatus for automatically molding briquets, and while features of the machine may be utilized in molding briquets for any desired purpose or of any desired shape, the machine is primarily designed for molding briquets to be utilized as firelighters, and to this end embody in their composition suitable inflammable and combustible substances which will ignite easily, as by the application of the flame of a match, and will maintain the combustion and generate sufficient heat to thoroughly ignite ordinary fuel. The briquets manufactured for commercial purposes with the machine of the present invention are preferably composed of sawdust which is placed in the molds in a loose condition and naphthalene which is liquefied by heat, and with which the sawdust is impregnated after being placed in the molds, suitable provision being made in the machine whereby the material is permitted to harden and the briquets subsequently disengaged from the molds and discharged.

The machine embodies in its construction an endless series of molds with means whereby the sawdust or body material is fed to the molds in a loose and relatively dry condition in regulated quantities, and means whereby the loosely filled molds are supplied with a liquefied binder and combustible material, such molds being then maintained in an upright position until the binder is sufficiently hard to permit of the inversion of the molds, and the briquets subsequently discharged by a positive movement, which will free the same from the mold walls and from the discharging mechanism.

Referring to the accompanying drawings,—Figure 1 is a perspective view of one end of a machine embodying the present improvements, the portions of the machine not shown in this view being an extension of the endless series of molds together with the guiding and supporting mechanism therefor, and the extension of the conveyer for carrying away the completed briquets. Fig. 2 is a detail section in a vertical plane, with portions in elevation, portions broken away and portions in outline, showing the binder heating and feeding mechanism, together with a part of the mechanism for discharging the completed briquets. Fig. 3 is a similar view showing the mechanism for feeding regulated quantities of sawdust or other body forming material to the molds before the binding material is supplied thereto. Fig. 4 is a section in a vertical transverse plane through the frame of the machine showing the upper and lower reaches of the endless molds, and the mechanism for discharging the briquets therefrom. Fig. 5 is a detail section through one of the molds in inverted position; Fig. 6 is a detail of a portion of the discharging mechanism; Fig. 7 is a bottom plan view of a transverse series of molds illustrating the connection between the discharging mechanism of several molds. Fig. 8 is a detail on a very much reduced scale illustrating the intermittent feed mechanism for the endless molds. Fig. 9 is a detail of a stirrup employed for positioning the operating parts of the discharging mechanism carried by the molds.

Like letters of reference in the several figures indicate the same parts.

The machine embodies in its construction a suitable horizontally extending frame having suitable top and bottom tracks A on which travel the top and bottom reaches of an endless carrier, the opposite wheels B of which are connected by cross pieces $b$ and adjacent wheels on the same side by links $b'$. The ends of the conveyer pass around sprockets mounted on transverse shafts journaled in the frame, one of said shafts being shown at C in Fig. 1 and said shafts and sprockets are rotated with an intermittent movement preferably through the medium of an intermediate lever $C'$, Fig. 8, oscillated from a crank disk $C^2$ and connected by links $C^3$ with ratchet levers $C^4$ adapted to coöperate with ratchet wheel $C^5$ on the sprocket shafts C, C. On each of the transverse connecting pieces $b$ of the endless conveyer there is mounted a transverse series of molds D, said molds being of outwardly flaring formation, and each having inwardly projecting curved corner pieces $d$, see Figs. 5 and 7, the connection between the molds and the cross pieces being formed by screw threaded thimbles $D'$ passing through the bottom of the mold and cross piece and held in place by set nuts $D^2$. From Fig. 5 it will be seen that each mold is connected with its cross piece by two thimbles $D'$ and in each thimble there is journaled a tapering plug $E$ which projects up to substantially the level of the top thereof, so as to form two openings or flues through the briquet which is shaped by the mold. These plugs $E$ are provided with base flanges $e$ and serve not only as the means for forming the central openings in the briquet, but also as the briquet engaging portion of the discharging mechanism for which purpose they are mounted so as to move longitudinally in the thimbles $D'$ and so as to be capable of an oscillatory movement therein.

Conveniently, the stem $E'$ of each plug or discharger is surrounded by a gland $D^3$, and on its extremity it is provided with a laterally extending arm $E^2$, keyed to the stem and held against longitudinal movement by suitable set nuts or otherwise. A suitable spring $E^3$ is provided for holding the stems and plugs normally in their retracted position shown in full lines in Fig. 5. The arms $E^2$ of all the plugs or discharging devices of each transverse series of molds are connected by an operating bar $E^4$, Figs. 4 and 7, upon which there is a central stud or projection $E^5$ for coöperation with an oscillating device which will turn the plugs in their bearings or thimbles as will be hereinafter described.

Above one end of the upper reach of the endless chain of molds is the mechanism for supplying the ingredients from which the briquets are formed. As illustrated in the drawings, the machine is designed to form the briquets from sawdust impregnated and bound together by liquefied naphthalene, and to supply the sawdust and naphthalene, suitable hoppers $F$ and $G$ are provided, such hoppers being of considerable capacity, and mechanism is arranged to feed the sawdust and liquefied naphthalene in properly regulated quantities to fill the molds and bind the sawdust together in a solid mass, in each of the molds.

Considering first the sawdust feeding mechanism, it will be noted from Fig. 1 that the sawdust hopper is properly heated for drying and warming the sawdust by steam admitted through a pipe $f$ to a heating coil $f'$, Fig. 3, within the hopper, and that suitable agitators $f^2$ within the hopper are set in motion by a chain and sprocket drive $f^3$ deriving its motion from a countershaft $H$. Immediately below the hopper $F$ and in position to receive sawdust from the hopper, is a movable measuring chamber $F'$, such chamber being movable from the position shown in full lines to that shown in dotted lines in Fig. 3, through the operation of an eccentric $F^2$ on a shaft $F^3$. A swinging gate $F^4$ is provided for the bottom of the measuring chamber $F'$ and such gate is operated through the medium of a link $F^5$ connected with one end of a lever $F^6$ pivotally mounted on a slide forming a part of the measuring chamber. At its upper end the lever is adapted to contact with a fixed shoulder $F^{60}$ when the measuring chamber is moved to the position shown in dotted lines, thereby swinging the gate or door downwardly, so as to discharge the contents of the measuring chamber down a chute $F^7$ whereby the sawdust is conducted to the transverse series of molds at that time immediately below the lower end of the chute. A spring $F^8$ is provided for closing the bottom or door $F^4$ when the measuring chamber begins its retrograde movement, and in order to close the communication between the hopper and measuring chamber a second slide $F^9$ is provided which is adapted to be operated by an eccentric $F^{10}$ on the shaft $F^3$. The throw of the eccentric is such that the measuring chamber and its slide and the slide $F^9$ simultaneously move in opposite directions to close and open the communication between the hopper and measuring chamber, and by reason of this arrangement each part is required to move only one half of the distance necessary to effect the opening and closing of the measuring chamber.

The measured quantity of saw dust having been delivered from the measuring chamber down the chute into the transverse series of molds, the molds are advanced in the direction of the arrow in Fig. 3 and pass beneath a rotary evening brush $I$, whereby the loose material in the molds will be distributed and the top of the same leveled so as to evenly fill the molds.

After passing beneath the evening brush the molds pass under and are temporarily arrested in their movement in position to receive the liquefied napthalene from the naphthalene distributing mechanism which is arranged as follows:—This mechanism will be best understood by reference to Fig. 2, wherein the bottom of the naphthalene hopper $G$ is shown with a steam coil $g$ therein for liquefying the naphthalene by heating the same to a sufficiently high temperature. When liquefied the naphthalene flows down through a pipe connection $g'$ controlled by a valve $G'$ into a steam heated chamber $G^2$. This chamber is provided at the front with a door $g^2$ whereby it may be readily cleaned although the door is normally closed and fastened liquid tight. The chamber $G^2$ forms the upper compartment of a steam chest which extends entirely across the endless chain of molds and the lower portion of the chest has a steam chamber G³ which contains a relatively large volume of steam and will maintain all the adjacent parts in a heated condition. At one side of the chest and chambers G² and G³ is a row of measuring cylinders K. Said cylinders are steam jacketed and provided with pistons K' adapted to be advanced by pressure springs K² and to be retracted by the engagement of cam arms or fingers $k$ mounted in a rotary shaft L so as to be capable of adjustment therein, whereby the range of rearward movement of the pistons may be accurately regulated. This regulation will be understood from Fig. 2 in which the parts are represented with one of the cam fingers $k$ in position to move away from the roller projection $k'$ on the piston rod, and obviously, by shortening, or lengthening the cam finger the piston will be retracted a greater or less distance and the capacity of the measuring cylinder correspondingly varied.

Each measuring cylinder K is in communication with the liquid naphthalene chamber G² through a pipe $g^3$ having a check valve therein, and each measuring cylinder is also in communication through a pipe $g^4$ with a transverse distributing chamber $g^5$ located below the steam chest. The pipe $g^4$ has a spring pressed check valve $g^8$ therein, the spring load on the valve being sufficient to keep the valve closed against the head of liquid above the same. Said pipes $g^3$ and $g^4$ have their check valves set to work similar to ordinary pump valves, and the pipes and valves are both located in the steam chest G³, the result being that the measuring cylinders and pistons form pumps which will draw the liquid naphthalene from the chamber G and discharge the same into the distributing chamber $g^5$. The discharge action is a quick action which will effectually clear the cylinders, cause the intake valve to seat, and fill the distributing chambers to effect a uniform discharge over the whole surface of the molds.

The distributing chambers G⁵ are preferably arranged with perforated or foraminous bottom plates $g^6$ and immediately beneath each pipe $g^4$ there is a supplemental foraminous distributing plate $g^7$ curved to force the liquid naphthalene to spread laterally and flow uniformly through all of the perforations. The result of this arrangement is to effect a very even distribution of the liquid naphthalene over the surface of each mold and it will be understood that at the time the naphthalene is discharged a transverse series of molds is temporarily arrested in position immediately below the steam chest and consequently all of the naphthalene will be caught by the molds and the sawdust or other comminuted briquet forming material in the molds. Owing to the heated condition and character of the sawdust the naphthalene will be at once absorbed thereby and inasmuch as the molds are closed at the bottom no escape will take place. The charged mold will by successive movements of the carrier travel away from the steam chest into a cooler region where the naphthalene will harden.

The endless carrier is made sufficiently long to insure the proper cooling and hardening of the briquet material, but inasmuch as the material adheres very firmly to the walls of the mold the complete hardening may proceed while the molds are traveling back to the starting point in the lower reach of the conveyer, at which time they will be supported upside down. Owing to the fact that the material adheres firmly to the walls of the molds, provision has to be made for insuring the effective discharge of each briquet. This is accomplished in the present machine by imparting to the discharging devices in the molds a longitudinal movement to break the adhesion between the briquets and walls of the mold and a rotary movement to break the adhesion between the briquets and discharging and aperture forming devices within the molds. These two movements may be accomplished either simultaneously or successively, as found most desirable, but in the accompanying drawings the operating mechanism for accomplishing both movements acts practically simultaneously.

By reference to Figs. 4 and 6 it will be seen that a transverse pusher frame M is mounted to reciprocate vertically over the lower reach of molds and this pusher frame when depressed is adapted to contact with the stems of a transverse row of discharging plugs in the molds to force the said plugs or dischargers downwardly so as to free the briquet from the walls of the mold. Upon the pusher frame M there is mounted a sliding bar M' having a yoke or socket $m'$ thereon adapted to receive the projection E⁵ of the rocker bar E⁴ of the mold stems or discharging devices, and consequently when the pusher frame M is depressed the projection E⁵ of the series of molds immediately below the pusher frame will enter the socket $m'$ and if at this time longitudinal movement be imparted to the sliding bar M' the discharging devices or plugs will be rotated on their individual axes, thus breaking the adhesion between said plugs or discharging devices and the briquets, thereby leaving the latter entirely free to drop by gravity onto a carrying belt O by which they are conveyed away from the machine.

In the preferred construction the pusher frame M is the bottom cross bar of a rectangular frame, the other members of which are the vertical side pieces M² and the top shaft M³. The shaft M³ extends across the machine above the upper reach of the endless series of molds and is provided with a pair of rollers $m^3$ which rest beneath pivoted frames N and said frames are adapted to be periodically depressed by the engagement of cam N' on the shaft L with antifriction rollers $n$ on the frames. With this construction it is clear that the pusher frame M will be periodically depressed and that this movement will occur in time with the operation of the measuring pumps for discharging the naphthalene into the molds at the top of the carrier, at which time the carrier is at rest. For imparting the longitudinal movement to the sliding bar M' the said bar is provided at one end with a roller $p$ which coöperates with a vertical lever P. The lever P is pivoted to the frame at an intermediate point and its upper end P' projects into position to coöperate with an axial cam $P^2$, Fig. 1, on the end of the shaft L. The position of the cam is so set that when the pusher frame has been depressed to a point where the socket has engaged the projection on the mold bar, the lever will be operated to move the sliding bar M' longitudinally and as a result the discharging plugs will be advanced and rotated on their own axes in the manner hereinbefore described.

The cams N' and $P^2$ terminate abruptly and the sliding bar M' and pusher frame M are returned to their normal positions by springs W and W', respectively, the return movements preferably occuring simultaneously and with a quick action which will insure the complete release of any briquets which might tend to hang in the molds.

Power required for operating the machine may be derived from a comparatively small motor and as a convenient arrangement, an electric motor S is located on the frame work at the top of the machine and through suitable reduction gearing in the form of belt and pulley drive connections operates the countershaft H at a relatively slow speed. The countershaft H through a drive chain connection $h$ rotates a shaft $h'$, and the latter, through a train of reduction gear wheels $h^2$, operates the shaft L hereinbefore referred to. A shaft $h^3$ driven by one of the intermediate gears serves to transmit power for operating the conveyer belt O through driving connections not fully shown, but embodying a drive chain $h^4$, shown in Fig. 1. The crank disk $C^2$ for intermittently advancing the molds, is mounted on the end of shaft L on the further side of the machine in Fig. 1, and is connected with the intermediate lever by a link connection T and the shaft $F^3$ on which the eccentrics for operating the cut-off mechanism of the sawdust measuring mechanism are mounted, is driven by a second countershaft T' best seen in Fig. 1, through a sprocket chain connection, one end of which is seen at $T^2$, while said shaft derives its motion from the countershaft H through a chain and sprocket drive $T^3$.

To insure the lateral positioning of the projection $E^9$ on the mold bars for coöperation with the socket or yoke $m'$ on the sliding bar M' there is mounted on a transverse bar V, Fig. 1, a stirrup V', Fig. 9, having converging walls between which the projections will be centered as they advance toward the pusher frame M. Should it be desired, the lateral movement of the mold bars may be imparted by the inclined walls of the stirrup so that the discharging plugs will be given their oscillatory or rotary movement preliminarily to their longitudinal movement which separates the briquets from the walls of the mold, but in the preferred arrangement, the longitudinal and oscillatory movements are imparted simultaneously.

In the operation of the machine the sawdust or other finely divided absorbent briquet body forming material is placed in the hopper F where it becomes thoroughly dried and warmed. Measured quantities are periodically discharged by the measuring mechanism into the transverse series of molds which have been brought to rest in the foot of the chute. The mold carrier then advances one step, bringing another series of molds into position, when the operation is repeated. As the molds are successively advanced the material therein is evened up and smoothed off by the scraper brush, and the molds are brought to rest beneath the binder measuring and distributing mechanism. With naphthalene, which at ordinary temperatures is a solid, it is placed in the hopper G and liquefied, as before explained, by the heating coils in the hopper. When liquid, it flows down into the transverse chamber $G^2$ from which it is drawn in measured quantities by the measuring pumps, and discharged through the distributing chambers into the molds which have been brought to rest beneath the same. The discharge of the liquefied naphthalene onto the body material in the molds practically completes the filling operation, for the naphthalent at once penetrates into the interstices of the body material and is absorbed thereby so that when hardened it is a solid. When discharged from the molds the briquets present the appearance shown at X in Fig. 1; that is to say, they are of generally frusto-conical form with tapered openings therethrough and with semi-cylindrical depressions in each of the corners. These tapered openings and semi-cylindrical depressions form flues and increase the surface area of the briquets in such wise as to materially promote combustion and afford edges and corners which may be readily ignited by the simple application of the flame of a match. One of the briquets is sufficient to start a fire in an ordinary domestic stove or range so as to thoroughly ignite coal or wood therein, and by the employment of such briquets cleanliness and economy is greatly promoted.

Having thus described my invention, what I claim as new and desire to secure by Letters Patent of the United States, is:

1. In a briquet forming machine, the combination with an endless series of molds, each of tapered or flaring formation, and each embodying an internal longitudinally movable and oscillatory briquet discharging means, of means for feeding briquet forming material in measured quantities to said molds, means for feeding a liquid binding agent to the molds, and means for operating said discharging mechanism to free the briquets from adhesion to the walls of the mold.

2. In a briquet molding machine, the combination with an endless series of molds, each embodying an internal longitudinally movable and oscillatory discharging device, of means for moving said discharging devices longitudinally and oscillating the same, to break the adhesion between the briquets and the walls of the molds and discharging devices, means for filling the molds while in an upright position, and means for intermittently moving the series of molds toward and from the filling mechanism and discharger operating mechanism.

3. In a briquet molding machine, the combination with an endless series of molds, each embodying a longitudinally movable and oscillatory plug within the same, means for filling the mold when in upright position, and means for moving said plugs longitudinally and oscillating the same when the molds are in inverted position to break the adhesion between the briquets and walls of the mold and plug to effect the discharge of the briquets.

4. In a briquet molding machine, the combination with an endless series of molds, of a longitudinally movable and oscillatory discharger mounted within each of the molds, means for moving said discharger longitudinally and for oscillating the same to break the adhesion of the briquet to effect the discharge of the same, and a filling mechanism for the molds embodying means for feeding measured quantities of briquet body forming material, and means for feeding measured quantities of binding material arranged in position for supplying said materials to the molds at successive points in the travel of the molds.

5. In a briquet molding machine, the combination with an endless series of briquet molds, and means for moving said molds intermittently, of means for feeding measured quantities of loose sub-divided briquet body forming material to the molds, when at one stage in their movement, and means for feeding a liquefied binding agent in measured quantities to the molds at a subsequent stage in their movement, whereby the body material held by the molds will be impregnated with the binding agent subsequently deposited thereon.

6. In a briquet molding machine, the combination with an endless series of molds, and means for intermittently moving said molds step-by-step, of a hopper for comminuted body forming material, a measuring chamber into which said material is discharged from the hopper, and means for conducting the measured material to the molds at one stage in their movement, a hopper for binding material, a measuring mechanism for the binding material discharged from the hopper, and a distributer into which the binding material is discharged from the measuring mechanism, said distributer being located in position to discharge the binding material on the body material previously deposited in the molds.

7. In a briquet forming machine, the combination with an endless series of molds, each of tapered or flaring formation, and means for supporting said molds in upright position for filling and inverted position for discharging, of longitudinally movable plugs located within said molds and having flanged bases whereby said plugs will form openings in the briquets and operate as dischargers to break the adhesion between the briquets and molds, and means for moving said plugs longitudinally when the molds are in inverted position.

8. In a briquet forming machine, the combination with an endless series of molds, and means for supporting said molds in upright position for filling and in inverted position for discharging, of plugs projecting within said molds to form internal apertures through the briquets, and means for imparting a rotary movement to said plugs for breaking the adhesion between the briquets and plugs, whereby the briquets will be freed for discharge from the molds.

9. In a briquet forming machine, the combination with an endless series of molds arranged in transverse rows, and means for supporting said molds in upright position for filling and in inverted position for discharging, of removable plugs mounted in said molds to form apertures in the briquets, and means for simultaneously moving all of the plugs of each transverse row of molds in succession for discharging the briquets therefrom.

10. In a briquet forming machine, the combination with an endless series of molds and means for supporting said molds in upright position for filling and in inverted position for discharging, of spring pressed plugs projecting within said molds to form apertures through the briquets, and means for moving said plugs longitudinally against the tension of the spring when the molds are inverted for discharging the briquets from the molds.

11. In a briquet forming machine, the combination with an endless series of molds arranged in transverse rows and movable plugs mounted in and projecting upwardly from the bottoms of the molds for forming apertures in the briquets, of connections between the movable plugs of the molds in each transverse row, and means for simultaneously moving said plugs to effect the discharge of the briquets from the molds and for breaking the adhesion between the briquets and plugs.

12. In a briquet forming machine, the combination with an endless series of molds arranged in transverse rows, and means for supporting said mold in upright position for filling and in inverted position for discharging, of movable dischargers mounted in and projecting upwardly from the bottoms of said molds, and a reciprocatory pusher frame adapted to coöperate with the dischargers of each transverse row of molds in succession and means for oscillating said dischargers, whereby the adhesion between the briquets and dischargers is broken and the briquets ejected.

13. In a briquet forming machine, the combination with an endless series of molds arranged in transverse rows and means for supporting said rows in upright position for filling and in inverted position for discharging, of rotary and longitudinally movable dischargers mounted in said molds, a reciprocatory pusher frame adapted to coöperate with the dischargers of each row in succession, for moving the same longitudinally, and a sliding bar mounted on said pusher frame and adapted to coöperate with said pushers for imparting a rotary movement thereto, whereby the adhesion between the briquets and pushers is broken.

14. In a briquet forming machine, the combination with an endless series of molds arranged in transverse rows and means for supporting said molds in upright position for filling and in inverted position for discharging, and dischargers mounted to move longitudinally and angularly in said molds, of a reciprocatory pusher frame for coöperating with the dischargers of the rows in succession for moving the same longitudinally, and a sliding bar for coöperating with said dischargers for moving the same angularly, springs for returning said sliding bar and pusher frame to normal position, and cams having abrupt terminals for advancing said pusher frame and sliding bar respectively, whereby the dischargers will be advanced and turned with a slow motion and returned to normal position with a quick motion.

15. In a briquet forming machine, the combination with an endless series of molds and mechanism for advancing said molds intermittently, of means for feeding briquet body forming material in measured quantity to the molds, and for distributing the same therein, and a liquid binder feeding mechanism embodying a heated supply receptacle, a measuring pump, and a distributer, there being timed connections between the pump operating mechanism and mold feeding mechanism, whereby the binder will be discharged on the body material in the molds, when the molds are at rest beneath the distributer.

16. In a briquet forming machine, the combination with an endless series of molds, means for feeding said molds intermittently and means for filling said molds with body forming material, of a binder feeding mechanism embodying a supply hopper, a measuring pump, a distributer located above the molds in position to distribute the binder thereto, while the molds are at rest, and means for heating said binder in the supply receptacle, pump and pipe connections between the receptacle, pump and distributer.

17. In a briquet forming machine, the combination with an endless series of molds arranged in transverse rows, means for feeding said molds intermittently, and means for feeding and distributing briquet body forming material in said molds, of a liquid binder feeding mechanism embodying a transverse steam chest, a binder chamber on said steam chest, a measuring pump at one side of the steam chest, pipe connections extending through the steam chest to the pump, a distributer below the steam chest, and pipe connections extending from the pump through the steam chest to the distributer, there being operating connections intermediate the pump and mold feeding mechanism, whereby the pump is actuated to discharge the binder while the molds are at rest beneath the distributer.

18. In a briquet forming machine, the combination with an endless series of molds arranged in transverse rows, means for feeding said molds intermittently, dischargers movably mounted in the molds, and means for feeding briquet body forming material to the molds, of a binder feeding mechanism embodying measuring pumps and distributers, a discharger operating mechanism for coöperation with the dischargers in the molds, and driving connections intermediate the pump discharger operating mechanism and mold feeding mechanism timed to operate the pump for discharging the binder, and for operating the dischargers while the molds are at rest between their intermittent movements.

19. In a briquet forming machine, the combination with an endless series of molds and means for feeding said molds intermittently, of means for supplying briquet body forming material to the molds, and a binder feeding mechanism embodying a distributer, a pump having a piston, a spring for advancing said piston to discharge the binder and driving connections for retracting the piston against the tension of said spring, whereby the binder will be discharged rapidly to clear the pump and effect a uniform distribution of the binder.

20. In a briquet molding machine, the combination with an endless series of molds, means for supplying said molds with briquet body forming material, and a liquid binder feeding mechanism embodying a pump having a spring-pressed plunger and a power operated shaft for retracting said plunger, having adjustable cam fingers thereon for coöperation with the plunger, whereby the range of movement of the plunger and capacity of the pump may be regulated.

WESLEY T. COLLINS.

Witnesses:
ALEXANDER S. STEUART,
THOMAS DURANT.